United States Patent [19]

Yang

[11] Patent Number: 5,644,200
[45] Date of Patent: Jul. 1, 1997

[54] DRIVING ELECTRICAL MACHINE SPEED CONTROLLED POWER COMBINED SYSTEM AND DEVICE

[76] Inventor: Tai-Her Yang, No. 32 Lane 29, Taipin St., Si-Hu Town, Dzan-Hwa, Taiwan

[21] Appl. No.: 591,103

[22] Filed: Jan. 25, 1996

Related U.S. Application Data

[63] Continuation of Ser. No. 317,634, Oct. 3, 1994, abandoned.
[51] Int. Cl.$^6$ ..................................................... H02P 1/00
[52] U.S. Cl. .................. 318/139; 318/4; 318/59; 318/61; 318/62; 180/65.2; 180/65.6
[58] Field of Search ........................ 318/139, 3–4, 318/53–64, 66.84; 180/65.1–65.8

[56] References Cited

U.S. PATENT DOCUMENTS

| | | | |
|---|---|---|---|
| 3,923,115 | 12/1975 | Helling | 318/161 X |
| 4,165,795 | 8/1979 | Lynch et al. | 318/139 X |
| 4,616,803 | 10/1986 | Schils | 251/14 |
| 4,621,197 | 11/1986 | Tanaka | 318/4 |
| 4,827,148 | 5/1989 | Hirosawa | 318/4 |
| 5,081,365 | 1/1992 | Field et al. | 290/45 |
| 5,193,634 | 3/1993 | Masut | 180/65.2 |
| 5,214,358 | 5/1993 | Marshall | 318/139 |
| 5,301,764 | 4/1994 | Gardner | 318/587 |
| 5,343,970 | 9/1994 | Severinsky | 180/65.2 |
| 5,359,308 | 10/1994 | Sun et al. | 318/139 |

*Primary Examiner*—David S. Martin
*Attorney, Agent, or Firm*—Bacon & Thomas

[57] ABSTRACT

A combined driving structure is made up of an engine and an electrical machine. The engine is connected to the electrical machine through a clutch which allows the electrical machine to be used as a starting motor for the battery, and when the engine is started, allows the engine to drive a load and also drive the electrical machine to operate as a generator. In addition, the electrical machine can be operated as a motor at low speeds to drive the load by electrical power when the engine is stopped, and as a generator to provide regenerative braking for charging the battery, either with or without friction damping of the engine by the clutch.

7 Claims, 2 Drawing Sheets

DRIVING ELECTRICAL MACHINE SPEED CONTROLLED POWER COMBINED SYSTEM AND DEVICE

This application is a Continuation of application Ser. No. 08/317,634, filed Oct. 3, 1994 now abandoned.

BACKGROUND OF THE INVENTION

1. Field of the Invention

The present invention relates to a engine and electrical machine coupled through a clutch and control component.

2. Description of Related Art

In recent years, energy and noise pollution have become more and more serious problems, with electrical power driven carriers being considered as a potential solution. However, research and development of electrical power driven carriers has up to now been limited by the problem that increasing the capacity of the batteries to achieve a larger moving range increases the battery volume or number of batteries and consequently the weight of the carrier, resulting in greater electrical energy consumption and a failure to meet economic requirements. As a result, in the absence of a big breakthrough in solving battery technical problems, the more practical driving method is to use a combined driving structure.

SUMMARY OF THE INVENTION

The present invention is accordingly a unique combined driving structure made up of an electrical machine and an engine (or other rotational power devices) coupled through an eccentric clutch, also known as a centrifugally acting rim clutch, and an electrical machine control component to achieve the following working conditions in response to operation of a manual operating interface, a central controller and a drive control device:

A. The electrical machine is used as a starting motor, by operating the electrical machine at high speed to pull the drive side of the eccentric clutch to close and drive the engine, and when the engine is started, the engine not only drives the load, but also drives the electrical machine to operate as a generator.

B. The electrical machine is operated at low speed to drive the load by electrical power while the engine is stopped, the drive mode selections being determined by the electrical machine operating speed: if the electrical power drive is operated at low speed, the electrical machine is used to provide a generator brake; and if the electrical power drive is operated too fast, then the eccentric clutch is closed to drag the engine and function as a friction damping brake.

DETAILED DESCRIPTION OF THE INVENTION

The key components of the combined driving structure of the invention are as follows:

●An eccentric clutch set FC101, FC102: in the form of a double acting eccentric clutch constituted by two clutches embodied either in a multiple sleeve structure or in a common structure and incorporated into a three layers structure: including an inner layer, a middle layer and an external layer, wherein the inner layer is provided with a drive friction disk to act outwardly when the eccentric force reaches a preset value so as to couple with an output shaft for mutual driving, the middle layer is combined with the engine and is provided with an inner ring friction coupling surface while its outside is provided with a drive friction disk to act outwardly when the eccentric force reaches a preset value so as to be friction coupled with the inner ring of the external layer to constitute an output clutch function, and the external layer structure is further combined with the engine for temporally releasing the linkage between the engine and the load when the engine is operated at a low speed.

●An electrical machine E101: which is a series or auxiliary compound excited electrical machine having the electrical characteristics which cause the rotational speed to increase with a corresponding decreasing load, or an AC or DC brush or brushless machine able to perform current control (including constant current control), to provide added torque functions following the load control.

●A drive controller D101 controlled by a manual operating interface M101 and a central controller CCU101 to operate the electrical machine as a motor to provide operations such as start, stop, speed change, or positive/reverse rotation; or to operate the electrical machine as a generator with controlled generation capacity.

Figure 1:
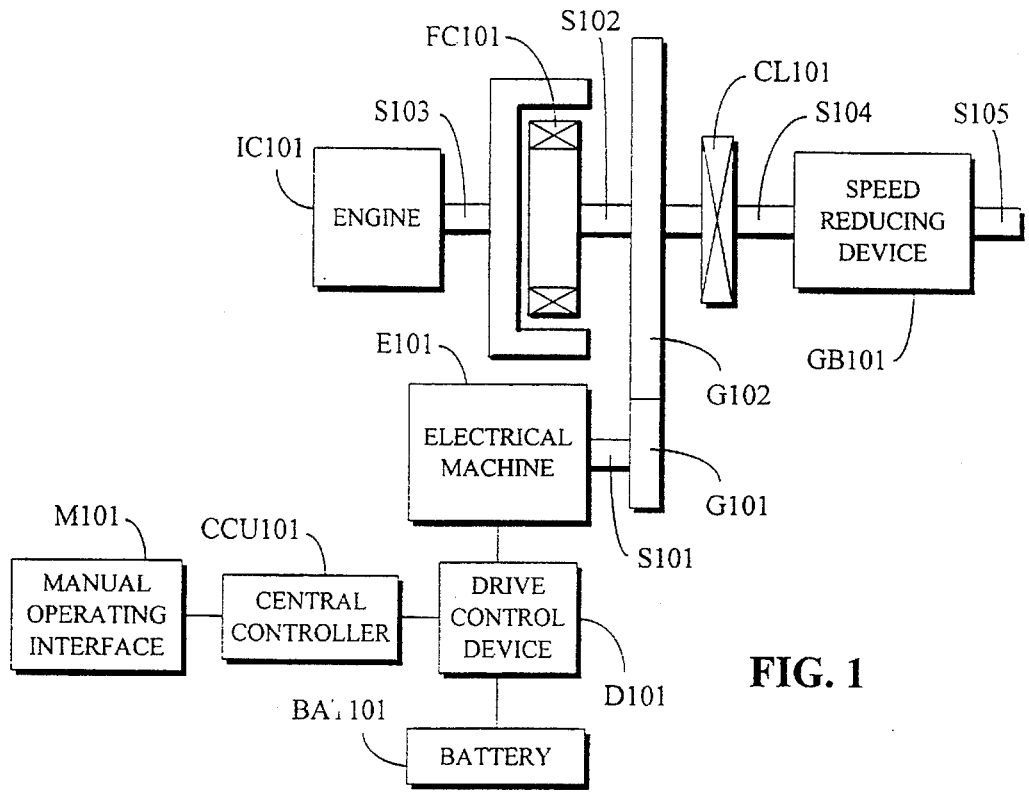
FIG. 1 is a schematic drawing of a first preferred embodiment.

These key components are combined in various preferred embodiments of the invention as follows:

FIG. 1 illustrates the first preferred embodiment of a speed controlled combined system and device in which the eccentric clutch FC101 and a second gear G102 are installed on a rotating shaft S102 between the drive shaft S103 of an engine IC101 and a load driving output shaft S104, wherein the output shaft S104 can be provided either to drive the load directly or to drive the load through an output clutch CL101 or a speed change mechanism GB101. In the illustrated example, the second gear G102 is engaged with a first gear G101, although the illustrated gear train can be placed by a multiple staged speed reducer or other transmission components such as chain wheels.

An electrical machine E101 is combined with the first gear G101 and is controlled by a manual operating interface M101, central controller CCU101, and drive control device D101 to cause the electrical machine E101 to be powered by a battery BAT101 in order to provide a motor output for driving the gear G101 as follows: The gear G101 is rotated at high speed to drive the eccentric clutch FC101 to close and start the engine IC101, whereupon the engine IC101 either drives the load directly or through the speed reducing device GB101, while electrical machine E101 is either powered to drive the load with the engine IC101 together or the power to the electrical machine can be cut off to cause the electrical machine to be in a waiting state, or the electrical machine can be driven by the engine IC101 to be operated as a generator to charge the battery BAT101 or supply power to other loads.

For the purpose of AC power generation, the electrical machine E101 may be either a permanent magnet or a winding excited, variable frequency driven field type electrical device, or a brushed alternator type electrical device, with its armature winding being commonly connected via conducting rings for AC output and commutators for DC input/output, and whereby the AC output can be a variable frequency output or a constant frequency output through the engine constant speed control. In the case of high sliding speed, the load feedback may be used to drive the engine IC101 to provide a friction damping brake and the electrical machine E101 used for regeneration feedback braking functions, while in the case of low speed drive, below the rotation speed of eccentric clutch coupled with engine, the electrical machine may be operated as a motor to drive the load, and in the case of a low sliding speed, the electrical machine may be operated as a generator to a provide braking function by recovering the kinetic energy to the battery, or to supply power to the other loads to provide the braking function. A summary of the operating states of the various components for each of the above-described function are shown in Table 1. Specifically, table 1 shows the operating states of engine IC101 and gear direction (clockwise (CW) or counterclockwise (CCW)), engine speed (Stop, 0~Max (running speed), and Max→0 (deceleration)), battery status (charge/discharge), electric machine operation (motor/ generator), and clutch status (open/close) during the various functions selectable by manual control M101 and controller CCU101 as described above.

Figure 2:
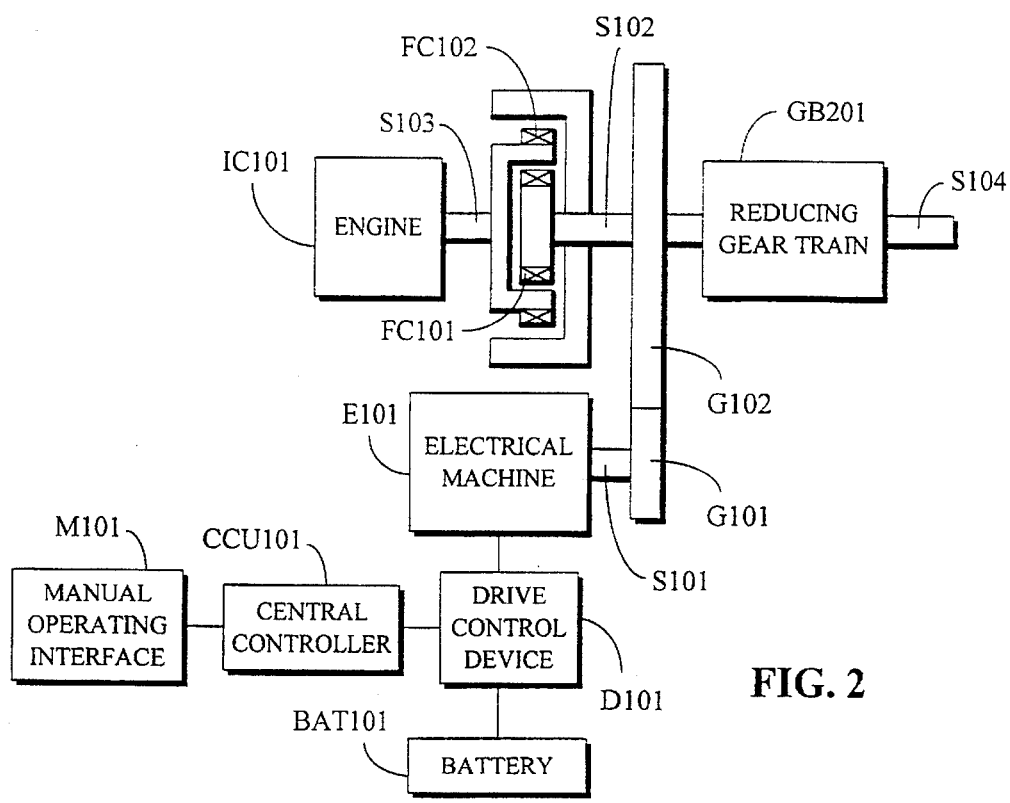
FIG. 2 is a schematic drawing of a second preferred embodiment.

FIG. 2 illustrates the second preferred embodiment of the invention in which the eccentric clutch set FC101, FC102 and the second gear G102 are installed between the drive shaft S103 of the engine IC101 and the load driving output shaft S104, wherein the output shaft S104 can be provided either to drive the load directly or to drive the load through the reducing gear train GB201. The second gear G102 is engaged with the first gear G101, or the illustrated gear train can be replaced by a multiple staged speed reducer or other transmission components such as chain wheels, and the electrical machine E101 is combined with the first gear G101 and is controlled by the manual operating interface M101, central controller CCU101 and the drive control device D101 to be powered by the battery BAT101 to drive the gear G101. Electric machine E101 is again equipped with AC power generating functions and includes a permanent magnet, winding excited, variable frequency driven field type electrical device, or a brushed alternator type electrical device, with its armature winding commonly connected to conducting rings for AC output and to commutators for DC input/output, so that the AC output can be a variable frequency output or a constant frequency output through the engine constant speed control.

The double acting eccentric clutch set of this embodiment is constituted by the two eccentric clutches FC101 and FC102 embodied either in a sleeve joint structure or in a common structure, and is incorporated in a three layer structure including an inner layer, a middle layer and an external layer. The inner layer is provided with a drive friction disk to act outwardly when the eccentric force reaches a preset value and is combined with the output shaft for mutual driving. The middle layer is combined with the engine and is provided with an inner ring friction coupling surface while its outside is provided with a drive friction disk to act outwardly when the eccentric force reaches a preset value thereby to be friction coupled with the inner ring of the external layer to constitute an output clutch function, and the external layer structure is further combined with the engine for temporally releasing the linkage between the engine and the load when the engine is operated at a low speed.

This embodiment is controlled by the central controller CCU101, manual operating interface M101, electrical machine drive device D101, and the battery BAT101 to provide the following functions:

● start engine: The electrical machine E101 is rotated at high speed to drive the double acting clutch FC101, FC102, so that the inner layer drive friction disk is coupled with middle layer inner ring to start the engine:

● Operation by engine: After the engine IC101 is started to drive the double acting clutch FC101, FC102, and when the speed of the middle ring structure is increased to a preset rotation speed, the outside drive friction disk of the middle layer is coupled with the external layer by the eccentric force to further drive the output shaft S104, thereby to drive the load directly or through the speed change mechanism and to drive the electrical machine E101 to be operated as a generator to charge the battery or to be waiting in a no-load operation at the OFF state, and when the engine speed is slowed down, the drive friction disk of the middle layer structure of the double acting eccentric clutch is withdrawn to cut off the connection with the output shaft and the engine is no-load operated.

● Combined power drive: While the engine IC101 is operated to drive the load, the electrical machine E101 supplies power to also help drive the load to constitute a combined power drive.

● Electric power drive: The electrical machine is powered by the battery BAT101 to operate at a low speed which is below the rotation speed of the inner layer drive friction disk of the double acting clutch FC101 and FC102 and the electrical machine E101 drives the load directly by electric power.

● Kinetic energy recovery at low sliding speed: When the load is sliding and the rotation speed of the driven output shaft S104 is below the rotation speed of the inner layer drive friction disk of the double acting eccentric clutch FC101 and FC102, then the electrical machine E101 is operated as a generator to provide regenerative braking for charging the battery.

● The kinetic energy recovery at high sliding speed: When the load is sliding at high speed and the rotation speed of the driven output shaft S104 is higher than the rotation speed of the inner layer drive friction disk of the double acting eccentric clutch FC101 and FC102, the inner layer and the middle layer are thereby coupled, and the engine IC101 is dragged to provide friction damping. The electrical machine E101 is also driven to operate as a generator to provide regenerative braking for charging the battery BAT101.

These functions are summarized in Table 2, which gives the specific operating states for the functions described above. Table 2 is identical to FIG. 1, except that the status of both clutches FC101 and FC102 is given in this table.

Figure 3:
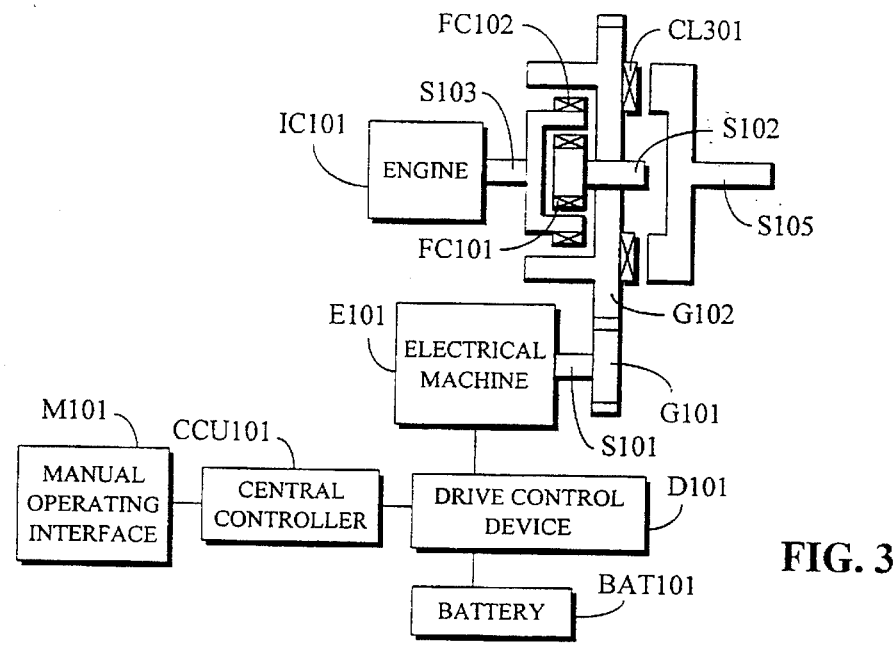
FIG. 3 is a schematic drawing of a third preferred embodiment.

FIG. 3 shows the third preferred embodiment of the invention, in which an output clutch CL301 is further installed between the second gear G102 and the output shaft S102 driven by the inner and external rings of the double acting eccentric clutch FC101, FC102, identical to that of the embodiment illustrated in FIG. 2, and the output shaft S105 for driving the load or the speed reducing mechanism, to thereby link or separate the two output shafts. The clutch CL301 is driven manually or by electromagnetic or fluid power, and when it is closed, this embodiment has the same functions as are described above in connection with the second preferred embodiment. When the clutch CL301 is released, however, this embodiment has the following additional function of generation at stand-still, in which the engine IC101 drives the middle layer and the external layer of the double acting clutch FC101, FC102 to be coupled, thereby to driving the electrical machine E101 to be operated as a generator to charge the battery or supply power to other loads, in which case the power generation can be further controlled by timing or capacity.

Electric machine E101 is again comprised of a permanent magnet or a winding excited, variable frequency driven field type electrical device, or a brushed alternator type electrical device, in which its armature winding is commonly connected to conducting rings for AC output and to commutators for DC input/output, and whereby the AC output can be a variable frequency output or a constant frequency output through the engine constant speed control.

These functions are summarized in Table 3, which gives the specific operating states of the various system components for each of the functions described above in connection with the third preferred embodiment of the invention. This table differs from Table 2 in its inclusion of operating states for clutch CL301.

Figure 4:
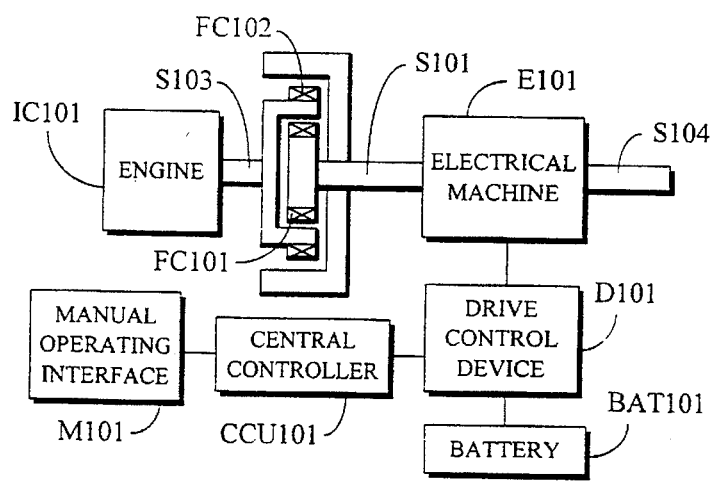
FIG. 4 is a schematic drawing of a fourth preferred embodiment.

FIG. 4 illustrates the fourth preferred embodiment of the invention, in which the output shafts of the electrical machine E101 and the engine IC101 are embodied in a common shaft structure, while the double acting clutch FC101, FC102 is installed between the electrical machine E101 and the engine IC101 and has its inner layer and external layer coupled with the common shaft S101 of the electrical machine E101 and the output shaft S104, while its middle layer is coupled with the engine rotating shaft S103, and the operation types include the following:

●The electrical machine E101 is operated at high speed to start the engine through the control of the manual operating interface M101, central controller CCU101, drive control device D101; and after the engine is started, driving of the electrical machine E101 is continued to help drive the load with the engine together, or the electrical machine is operated as a generator to charge the battery or supply power to the other loads. As in the previous embodiment, the electrical machine E101 is selected to be comprised of a permanent magnet or winding excited, variable frequency driven field type electrical device, or a brushed alternator type electrical device, having an armature winding commonly connected to the conducting rings for AC output and to commutators for DC input/output, whereby the AC output can be a variable frequency output or a constant frequency output through the engine constant speed control; or can be operated as a motor and controlled as to rotation directions and rotational speeds, or can be cut off by a transmission to remain in a waiting state;

●The electrical machine E101 is controlled to be operated a low speed, below the required rotation speed for the inner layer drive friction disk to couple with the middle layer inner ring of the double acting clutch, and the electrical machine drives the load by the electric power.

●The kinetic energy recovery at low sliding speed: When the load is sliding and the rotation speed of the driven output shaft S104 is below the rotation speed of the inner layer drive friction disk of the double acting eccentric clutch FC101 and FC102, then the electrical machine E101 is operated as a generator to provide regenerative braking by charging the battery.

●Engine friction damping and kinetic energy recovery at high sliding speed: When the load is sliding at high speed and the rotation speed of the driven output shaft S104 is higher than the rotation speed of the inner layer drive friction disk of the double acting eccentric clutch FC101 and FC102, the inner layer and the middle layer are thereby coupled, and the engine IC101 is dragged to provide friction damping. The electrical machine E101 is also driven to operated as a generator to provide regenerative braking by charging the battery BAT101.

Figure 5:
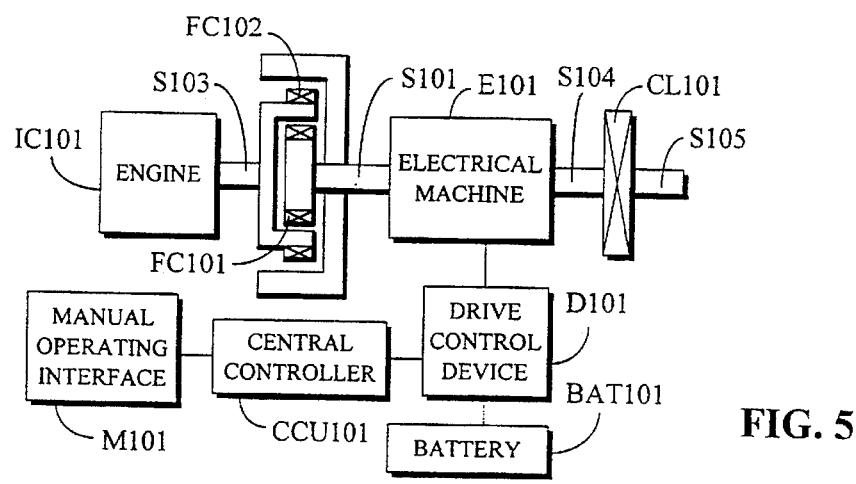
FIG. 5 is a schematic drawing of a fifth preferred embodiment.

The above said functions are summarized in Table 4, which gives the specific operating status of the various system components for each of the functions described above in connection with the fourth preferred embodiment of the invention. FIG. 5 shows the fifth preferred embodiment of the invention, in which a clutch CL101 is further installed between the output shaft S104 and the loading shaft S105 described in connection with the embodiment of FIG. 4, and the clutch is driven manually or by electromagnetic or fluid power, such that when it is closed, the combined system has the same functions as the fourth embodiments, and when the clutch CL101 is released, the combined system has the additional function of generation at stand-still, in which the engine IC101 drives the middle layer and the external layer of the double acting clutch FC101, FC102 to be coupled, to thereby further drive the electrical machine E101 to be operated as a generator to charge the battery BAT101 or supply power to other loads, with the electrical machine E101 being selected to be comprised of a permanent magnet or a winding excited, variable frequency driven field type electrical device, or a brushed alternator type electrical device, with its armature winding commonly connected to a conducting rings for AC output and to commutators for DC input/output, whereby the AC output can be a varied frequency output or a constant frequency output through the engine constant speed control and its generation function can be further controlled by timing or capacity.

These functions are summarized in Table 5 which gives the specific generating states of the various system components for each of the functions described above in connection with the fifth preferred embodiments of the invention. The above embodiments have in common that the electrical machine and the engine constitute a combined power, multiple functioned driving system through a particular transmission structure which employs the relationship between the electrical machine rotation speed and the eccentric clutch changeover point to cause the electric motor and/or the engine to drive the load. For city driving conditions of frequent waiting in crowded traffic, this design provides a high efficiency, low pollution electric vehicle.

TABLE 1

| M101/CCU101 | IC101 | E101 | D101 | BAT-101 | G101 | G102 | FC101 | CL101 | S101 | S102 | S103 | S104 | S105 |
|---|---|---|---|---|---|---|---|---|---|---|---|---|---|
| STOP | STOP | STOP | OFF | Ready Discharge | Stop | STOP | OPEN | OPEN | STOP | STOP | STOP | STOP | STOP |
| START | CCW Motor Start | CW Operation | ON | | CW | CCW | CLOSE | OPEN | CW | CCW | CCW | STOP | STOP |

TABLE 1-continued

| M101/CCU101 | IC101 | E101 | D101 | BAT-101 | G101 | G102 | FC101 | CL101 | S101 | S102 | S103 | S104 | S105 |
|---|---|---|---|---|---|---|---|---|---|---|---|---|---|
| IC101 in operation and charging | 0~Max CCW operation | CW Generation | ON | Charge | CW | CCW | CLOSE | CLOSE | CW | CCW | CCW | CCW | CCW |
| IC101 in operation | 0~Max CCW operation | No load operation | OFF | Ready | CW | CCW | CLOSE | CLOSE | CW | CCW | CCW | CCW | CCW |
| Combined Power Driving | 0~Max CCW operation | Motor CW operation | ON | Discharge | CW | CCW | CLOSE | CLOSE | CW | CCW | CCW | CCW | CCW |
| Sliding Brake | Max→0 | CW generation | ON | Charge | CW | CCW | CLOSE | CLOSE | CW | CCW OR STOP | CCW | CCW | CCW |
| Electric powered CW | STOP | Motor low speed CW operation | ON | Discharge | CW | CCW | OPEN | CLOSE | CW | CCW | STOP | CCW | CCW |
| Electric powered CCW | STOP | Motor low speed CCW operation | ON | Discharge | CCW | CW | OPEN | CLOSE | CCW | CW | STOP | CW | CW |
| Charge in Stand-Still (Controllable Charge rate or timing stop) or generate varied frequency or constant frequency AC output | 0~Max CCW operation | CW generation | On | Charge | CW | CCW | CLOSE | OPEN | CW | CCW | CCW | STOP | STOP |
| Remark | for the case of AC power generation output functions, E101 is selected to be an electrical machine with AC power generating functions comprised of a permanent magnet or winding excited, varied frequency driven field type electrical device, or a brushed alternator type electrical device, wherein its armature winding is commonly connected to conducting rings for AC output and to commutators for DC input/output | | | | | | | | | | | | |

TABLE 2

| M101/CCU101 | IC101 | E101 | D101 | BAT101 | G101 | G102 | FC101 | FC102 | S101 | S102 | S103 | S104 |
|---|---|---|---|---|---|---|---|---|---|---|---|---|
| STOP | STOP | STOP | OFF | Ready | Stop | STOP | OPEN | OPEN | STOP | STOP | STOP | STOP |
| START | CCW Start | Motor CW Operation | ON | Discharge | CW | CCW | CLOSE | CLOSE | CW | CCW | CCW | CCW |
| IC101 in operation and charging | 0~Max CCW operation | CW Generation | ON | Charge | CW | CCW | CLOSE | CLOSE | CW | CCW | CCW | CCW |
| IC101 in operation | 0~Max CCW operation | No load operation | OFF | Ready | CW | CCW | CLOSE | CLOSE | CW | CCW | CCW | CCW |
| Combined Power Driving | 0~Max CCW operation | Motor CW operation | ON | Discharge | CW | CCW | CLOSE | CLOSE | CW | CCW | CCW | CCW |
| Sliding Brake | Max→0 | CW generation | ON | Charge | CW | CCW | CLOSE | CLOSE | CW | CCW OR STOP | CCW | CCW |
| Electric powered CW | STOP | Motor low speed CW operation | ON | Discharge | CW | CCW | OPEN | CLOSE | CW | CCW | STOP | CCW |
| Electric powered CCW | STOP | Motor low speed CCW operation | ON | Discharge | CCW | CW | OPEN | CLOSE | CCW | CW | STOP | CW |
| Charge in Stand-Still (Controllable Charge rate or timing stop) | 0~Max CCW operation | CW generation | On | Charge | CW | CCW | CLOSE | OPEN | CW | CCW | CCW | CCW |

TABLE 2-continued

| M101/CCU101 | IC101 | E101 | D101 | BAT101 | G101 | G102 | FC101 | FC102 | S101 | S102 | S103 | S104 |
|---|---|---|---|---|---|---|---|---|---|---|---|---|
| or generate varied frequency or constant frequency AC output | | | | | | | | | | | | |
| Remark | for the case of AC power generation output functions, E101 is selected to be an electrical machine with AC power generating functions comprised of a permanent magnet or winding excited, varied frequency driven field type electrical device, or a brushed alternator type electrical device, wherein its armature winding is commonly connected to conducting rings for AC output and to commutators for DC input/output | | | | | | | | | | | |

TABLE 3

| M101/CCU101 | IC101 | E101 | D101 | BAT-101 | G101 | G102 | FC101 | FC102 | CL301 | S101 | S102 | S103 | S105 |
|---|---|---|---|---|---|---|---|---|---|---|---|---|---|
| STOP | STOP | STOP | OFF | Ready | Stop | STOP | OPEN | OPEN | STOP | STOP | STOP | STOP | STOP |
| START | CCW Start | Motor CW Operation | ON | Discharge | CW | CCW | CLOSE | CLOSE | OPEN | CW | CCW | CCW | |
| IC101 in operation and charging | 0–Max CCW operation | CW Generation | ON | Charge | CW | CCW | CLOSE | CLOSE | CLOSE | CW | CCW | CCW | CCW |
| IC101 in operation | 0–Max CCW operation | No load operation | OFF | Ready | CW | CCW | CLOSE | CLOSE | CLOSE | CW | CCW | CCW | CCW |
| Combined Power Driving | 0–Max CCW operation | Motor CW operation | ON | Discharge | CW | CCW | CLOSE | CLOSE | CLOSE | CW | CCW | CCW | CCW |
| Sliding Brake | Max→0 | CW generation | ON | Charge | CW | CCW | CLOSE | CLOSE | CLOSE | CW | CCW | CCW OR STOP | CCW |
| Electric powered CW | STOP | Motor low speed CW operation | ON | Discharge | CW | CCW | OPEN | CLOSE | CLOSE | CW | CCW | STOP | CCW |
| Electric powered CCW | STOP | Motor low speed CW operation | ON | Discharge | CCW | CW | OPEN | OPEN | CLOSE | CCW | CW | STOP | CW |
| Charge in Stand-Still (Controllable Charge rate or timing stop) or generate varied frequency or constant frequency AC output | 0–Max CCW operation | CW generation | On | Charge | CW | CCW | CLOSE | OPEN | OPEN | CW | CCW | CCW | STOP |
| Remark | for the case of AC power generation output functions, E101 is selected to be an electrical machine with AC power generating functions comprised of a permanent magnet or winding excited, varied frequency driven field type electrical device, or a brushed alternator type electrical device, wherein its armature winding is commonly connected to conducting rings for AC output and to commutators for DC input/output | | | | | | | | | | | | |

TABLE 4

| M101/CCU101 | IC101 | E101 | D101 | BAT101 | FC101 | FC102 | S101 | S103 | S104 |
|---|---|---|---|---|---|---|---|---|---|
| STOP | STOP | STOP | OFF | Ready | OPEN | OPEN | CW | CW | CW |
| START | CCW Start | Motor CW Operation | ON | Discharge | CLOSE | CLOSE | CW | CW | CW |

TABLE 4-continued

| M101/CCU101 | IC101 | E101 | D101 | BAT101 | FC101 | FC102 | S101 | S103 | S104 |
|---|---|---|---|---|---|---|---|---|---|
| IC101 in operation and charging | 0~Max CCW operation | CW Generation | ON | Charge | CLOSE | CLOSE | CW | CW | CW |
| IC101 in operation | 0~max CCW operation | No load operation | OFF | Ready | CLOSE | CLOSE | CW | CW | CW |
| Combined Power Driving | 0~Max CCW operation | Motor CW operation | ON | Discharge | CLOSE | CLOSE | CW | CW | CW |
| Sliding brake | Max→0 | CW generation | ON | Charge | CLOSE | CLOSE | CW | CW OR STOP | CW |
| Electric powered CW | STOP | Motor low speed CW operation | ON | Discharge | OPEN | CLOSE | CW | STOP | CW |
| Electric powered CCW | STOP | Motor low speed CCW operation | ON | Discharge | OPEN | OPEN | CCW | STOP | CCW |
| Charge in stand-still (Controllable Charge rate or timing stop) or generate varied frequency or constant frequency AC output | 0~Max CCW operation | CW generation | On | Charge | CLOSE | OPEN | CW | CW | CW |
| Remark | | for the case of AC power generation output functions, E101 is selected to be an electrical machine with AC power generating functions comprised of a permanent magnet or winding excited, varied frequency driven field type electrical device, or a brushed alternator type electrical device, wherein its armature winding is commonly connected to conducting rings for AC output and to commutators to DC input/output | | | | | | | |

TABLE 5

| M101/CCU101 | IC101 | E101 | D101 | BAT101 | FC101 | FC102 | CL101 | S101 | S103 | S104 | S105 |
|---|---|---|---|---|---|---|---|---|---|---|---|
| STOP | STOP | STOP | OFF | Ready | OPEN | OPEN | STOP | STOP | STOP | STOP | STOP |
| START | CCW Start | Motor CW Operation | ON | Discharge | CLOSE | CLOSE | OPEN | CW | CW | CW | CW |
| IC101 in operation and charging | 0~Max CCW operation | CW Generation | ON | Charge | CLOSE | CLOSE | CLOSE | CW | CW | CW | CW |
| IC101 in operation | 0~Max CCW operation | No load operation | OFF | Ready | CLOSE | CLOSE | CLOSE | CW | CW | CW | CW |
| Combined Power Driving | 0~Max CCW operation | Motor CW operation | ON | Discharge | CLOSE | CLOSE | CLOSE | CW | CW | CW | CW |
| Sliding Brake | Max→0 | CW generation | ON | Charge | CLOSE | CLOSE | CLOSE | CW | CW OR STOP | CW | CW |
| Electric powered CW | STOP | Motor low speed CW operation | ON | Discharge | OPEN | CLOSE | CLOSE | CW | STOP | CW | CW |
| Electric powered CCW | STOP | Motor low speed CCW operation | ON | Discharge | OPEN | OPEN | CLOSE | CCW | STOP | CCW | CCW |
| Charge in Stand-Still (Controllable Charge rate or timing stop) or generate varied frequency or constant frequency AC output | 0~Max CCW operation | CW generation | On | Charge | CLOSE | OPEN | OPEN | CW | CW | CW | STOP |
| Remark | | for the case of AC power generation output functions, E101 is selected to be an electrical machine with AC power generating functions comprised of a permanent magnet or winding excited, varied frequency driven field type electrical device, or a brushed alternator type electrical device, wherein its armature winding is commonly connected to conducting rings for AC output and to commutators for DC input/output | | | | | | | | | |

I claim:

1. A combined engine and electrical device, comprising:

an engine;

an electrical machine;

means including a clutch for connecting the engine and electrical machine;

means including an output shaft for connecting the engine and electrical machine to a load;

a battery connected to the electrical machine; and means for controlling operation of the electrical machine in the following manner:

a. operating the electrical machine as a motor powered by electricity from said battery, at a speed sufficient to cause said clutch to close, thereby connecting the electrical machine to the engine and causing said electrical machine to function as a starter for said engine;

b. when the engine is running at a speed sufficient to cause said clutch to close and said engine is driving the load, operating the electrical machine to drive the load together with the engine; and c. operating the electrical machine as a motor powered by electricity from said battery, at a speed insufficient to cause said clutch to close in order to drive said load while the engine is stopped.

2. A device as claimed in claim 1, wherein said clutch is a two-way clutch arranged to close and connect said electrical machine to said engine upon rotation at a sufficient speed of either said electrical machine or said engine, and wherein said means for controlling said electrical machine and engine further carries out the function of causing said engine to drive said electrical machine to operate as a generator to charge said battery.

3. A device as claimed in claim 1, wherein said clutch is a two-way clutch arranged to close and connect said electrical machine to said engine upon rotation at a sufficient speed of either said electrical machine or said engine, and wherein said means for controlling said electrical machine and engine further carries out the function of operating said electrical machine as a motor while the engine is running, at a speed sufficient to cause said clutch to close and function as a friction brake for said motor.

4. A device as claimed in claim 1, wherein said clutch is a two-way clutch arranged to close and connect said electrical machine to said engine upon rotation at a sufficient speed of either said electrical machine or said engine, and wherein said means for controlling said electrical machine and engine further carries out the function of operating said electrical machine as a regenerative brake for charging said battery.

5. A device as claimed in claim 1, wherein said electrical machine is connected to said clutch by means of a gear train, and further comprising a second clutch positioned between said gear train and said output shaft.

6. A device as claimed in claim 1, further comprising a speed change mechanism connected between said clutch and said output shaft.

7. A combined engine and electrical device, comprising:

an engine;

an electrical machine;

means including a clutch for connecting the engine and electrical machine;

means including an output shaft for connecting the engine and electrical machine to a load;

a battery connected to the electrical machine; and means for controlling operation of the electrical machine in the following manner:

a. operating the electrical machine as a motor powered by electricity from said battery, at a speed sufficient to cause said clutch to close, thereby connecting the electrical machine to the engine and causing said electrical machine to function as a starter for said engine;

b. when the engine is running at a speed sufficient to cause said clutch to close and said engine is driving the load, operating the electrical machine to drive the load together with the engine;

c. operating the electrical machine as a motor powered by electricity from said battery, at a speed insufficient to cause said clutch to dose in order to drive said load while the engine is stopped;

d. when the load is slipping at a low rate, recovering excess kinetic energy by operating said electrical machine as a generator powered by said excess kinetic energy to charge said battery and provide regenerative braking without any friction braking by the clutch; and e. when the load is slipping at a high rate, causing the engine to drive the load and recover excess kinetic energy by driving said electrical machine as a generator to charge said battery and provide regenerative braking as said clutch closes to provide frictional damping.

* * * * *